(12) United States Patent
Tsubouchi

(10) Patent No.: US 6,694,732 B2
(45) Date of Patent: Feb. 24, 2004

(54) BRAKE MASTER CYLINDER

(75) Inventor: Kaoru Tsubouchi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/083,373

(22) Filed: Feb. 27, 2002

(65) Prior Publication Data
US 2002/0129602 A1 Sep. 19, 2002

(30) Foreign Application Priority Data

Feb. 27, 2001 (JP) ........................................ 2001-053004

(51) Int. Cl.$^7$ ................................................ B60T 11/20
(52) U.S. Cl. ........................................................ 60/562
(58) Field of Search ........................................... 60/562

(56) References Cited

U.S. PATENT DOCUMENTS

| 4,524,585 A | | 6/1985 | Coll et al. | |
| 5,074,197 A | * | 12/1991 | Mori et al. | 60/562 |
| 5,187,934 A | * | 2/1993 | Mori | 60/562 |
| 5,243,823 A | * | 9/1993 | Jordan et al. | 60/562 |
| 6,012,288 A | * | 1/2000 | Gualdoni et al. | 60/562 |

FOREIGN PATENT DOCUMENTS

| JP | 6-298072 A | 10/1994 |
| JP | 11-512681 A | 11/1999 |

* cited by examiner

Primary Examiner—Edward K. Look
Assistant Examiner—Michael Leslie
(74) Attorney, Agent, or Firm—Burns, Doane, Swecker & Mathis, LLP

(57) ABSTRACT

A brake master cylinder constructed to reduce the manufacturing cost and the size of the brake master cylinder includes first and second sealing members forming at least a part of first pressure chamber, and a third sealing member forming at least a part of a second pressure chamber. The first, second and third sealing members are engaged with the inner peripheral surface of a cylinder body and with the outer peripheral surface of respective first and second pistons. An annular member is positioned between the second and third sealing members. The annular member is supported by the cylinder body with a support member such as a pin or a ring.

19 Claims, 4 Drawing Sheets

BRAKE MASTER CYLINDER

This application is based on and claims priority under U.S.C. §119 with respect to Japanese Application No. 2001-053004 filed on Feb. 27, 2001, the entire content of which is incorporated herein by reference.

1. Field of the Invention

This invention generally relates to vehicle braking. More particularly, the present invention pertains to a brake master cylinder for a hydraulic pressure type braking device of a vehicle.

2. Background of the Invention

A variety of plunger type brake master cylinders are known in the art. These plunger type brake master cylinders possess the advantage of shortening the axial length of the brake master cylinder. Known plunger type brake master cylinders include a plurality of sealing members engaged with a cylinder body and provided between the internal periphery of the cylinder body and the outer periphery of pistons for defining first and second pressure chambers. The external diameter of first and second pistons of the known plunger type brake master cylinder is constant through substantially the entire length of the pistons. Examples of known brake master cylinders having such a construction are disclosed in Japanese Patent Laid-Open Publication No. H06-298072, Japanese Patent Laid-Open Publication No. H11-512681, U.S. Pat. No. 4,524,585, and U.S. Pat. No. 6,012,288.

According to the known brake master cylinder disclosed in Japanese Patent Laid-Open Publication No. H06-298072 and Japanese Patent Laid-Open Publication No. H11-512681, an annular member is provided between the inner peripheral surface of the cylinder body and the outer peripheral surface of the second piston, and the annular member is fixed on the cylinder body. In addition, sealing members for defining the first pressure chamber are provided on the internal diameter side and the external diameter side of the annular member respectively. Thus, the internal diameter of the cylinder body cannot be made to be approximately the same size as the external diameter of the piston. This brings about the drawback that the external diameter of the cylinder body becomes relatively large. Particularly with respect to the brake master cylinder disclosed in Japanese Patent Laid-Open Publication No. H06-298072, because a cap is positioned on the inner periphery of the cylinder body and a sleeve is positioned on the inner peripheral side of the cap, the total weight of the master cylinder becomes relatively large in accordance with the relatively large external diameter of the cylinder body.

In the brake master cylinder disclosed in U.S. Pat. No. 4,524,585, although the external diameter of the cylinder body can be relatively small because the sealing member for defining the pressure chamber is provided in an annular groove formed on the inner periphery of the cylinder body, the air is confined in the annular groove by the sealing member. Thus, this brake master cylinder suffers from the drawback that air bleeding is not performed. This brake master cylinder also suffers from the drawback that the assembling performance of the sealing member is significantly retarded.

With the brake master cylinder disclosed in U.S. Pat. No. 6,012,288, the cylinder body includes openings on both ends of cylinder bores and both ends of the cylinder bores are closed with plug-shaped members respectively. With this construction, the brake master cylinder is not sufficiently reliable.

A need thus exists for a brake master cylinder which is not as susceptible to the disadvantages and drawbacks discussed above.

SUMMARY OF THE INVENTION

According to one aspect, a brake master cylinder includes a cylinder body having a cylinder bore including a closed end and an open end, a plug shaped member positioned in the open end of the cylinder bore and secured to the cylinder body, a first piston slidably extending through the plug shaped member, a second piston positioned in the cylinder bore, a first sealing member engaged with the outer periphery of the first piston and the inner periphery of the cylinder body to be supported by the cylinder body, a second sealing member engaged with the outer periphery of the second piston and the inner periphery of the cylinder body to be supported by the cylinder body, and a third sealing member positioned between the second sealing member and the closed end of the cylinder bore and engaged with the outer peripheral surface of the second piston and the inner peripheral surface of the cylinder body to be supported by the cylinder body. A first pressure chamber has one end defined by the second piston and the second sealing member and the other end defined by the first piston and the first sealing member, while a second pressure chamber has one end defined by the cylinder body and the other end defined by the second piston and the third sealing member. A piston return mechanism is adapted to return the first piston and the second piston to respective return positions. A first radial bore is formed on the first piston and is movable from one side of the sealing member to the other side upon sliding movement of the first piston from the return position toward the closed end of the cylinder bore, and establishes communication between the first pressure chamber and a reservoir when the first piston is positioned at the return position. A second radial bore is formed on the second piston and is movable from one side of the third sealing member toward the other side of the third sealing member upon sliding movement of the second piston from the return position toward the closed end of the cylinder bore, and establishes communication between the second pressure chamber and the reservoir when the second piston is positioned at the return position. An annular member supported at the cylinder body is positioned between the second sealing member and the third sealing member for supporting the second and third sealing members by the cylinder body.

According to another aspect, a brake master cylinder includes a cylinder body having a cylinder bore closed at one end and open at an opposite end, a plug member threadably engaged with the cylinder body at the open end of the cylinder bore, an axially movable first piston passing through the plug member and provided with a first through bore in a wall of the first piston, an axially movable second piston positioned in the cylinder bore and provided with a second through bore in a wall of the second piston, a first sealing member providing a liquid-tight seal between the outer periphery of the first piston and the inner periphery of the cylinder body, a second sealing member providing a liquid-tight seal between an outer periphery of the second piston and the inner periphery of the cylinder body, and a third sealing member located axially between the second sealing member and the closed end of the cylinder bore and providing a liquid-tight seal between the outer peripheral surface of the second piston and the inner peripheral surface of the cylinder body. A first pressure chamber is defined in the cylinder bore between the first piston and the second piston, and a second pressure chamber is defined in the cylinder bore between the closed end of the cylinder bore and the second piston. Respective springs each apply a force to one of the first and second pistons to urge the first piston and the second piston to respective return positions at which the first through bore provides communication between the first pressure chamber and a first reservoir inlet formed in the cylinder bore and the second through bore provides communication between the second pressure chamber and a second reservoir inlet formed in the cylinder bore. The first through bore of the first piston is movable relative to the first sealing member upon sliding movement of the first piston from the return position toward the closed end of the cylinder bore, and the second through bore of the second piston is movable relative to the third sealing member upon sliding movement of the second piston from the return position toward the closed end of the cylinder bore. An annular member is supported at the cylinder bore by a support member, and is positioned between the second sealing member and the third sealing member to support the second and third sealing members.

BRIEF DESCRIPTION OF THE DRAWING FIGURES

The foregoing and the additional features and characteristics of the present invention will become more apparent from the following detailed description considered with reference to the accompanying drawing figures in which like reference numerals designate like elements.

DETAILED DESCRIPTION OF THE INVENTION

Figure 1:
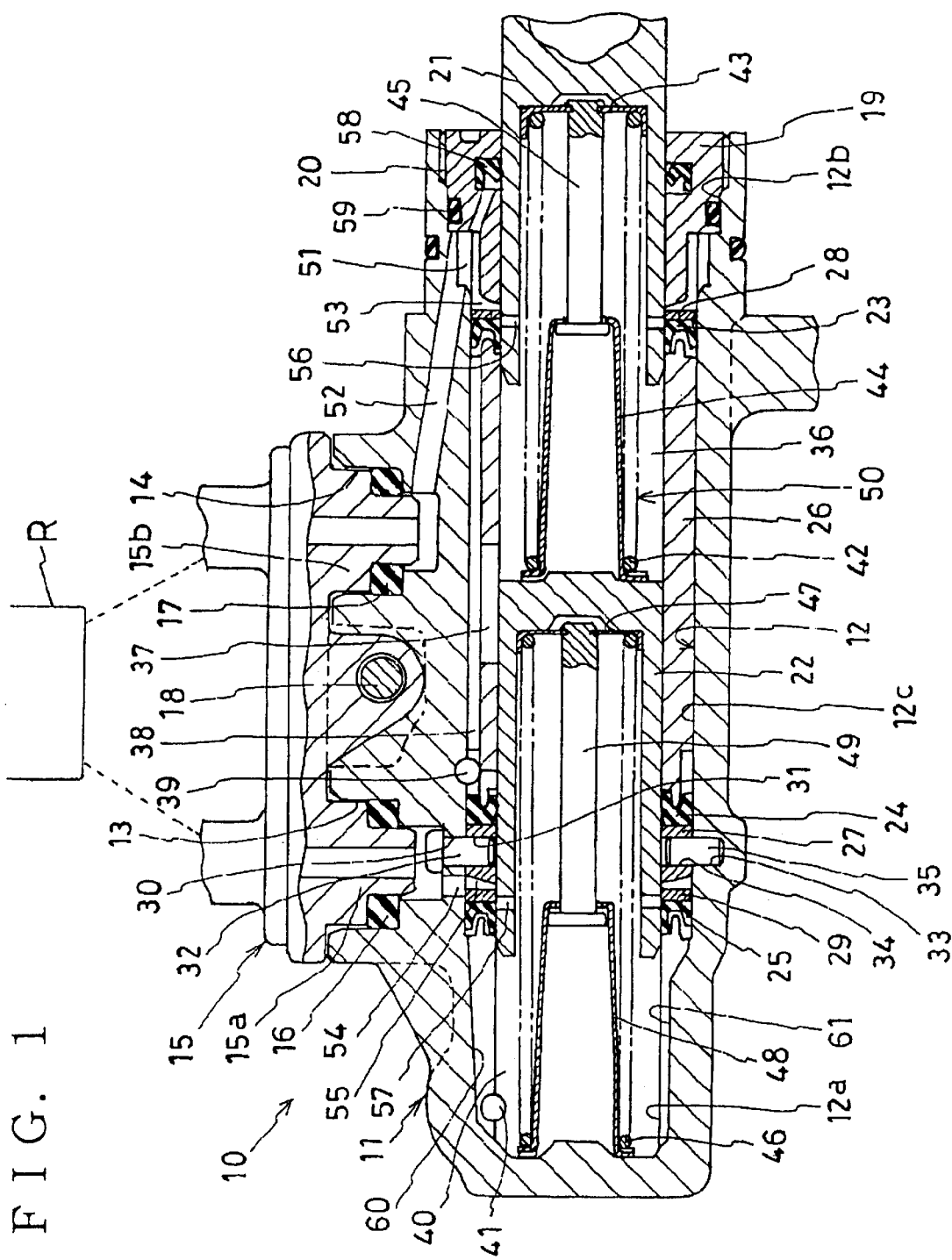
FIG. 1 is a longitudinal cross-sectional view of a brake master cylinder according to a first embodiment, with the brake master cylinder under a non-operation condition.

FIG. 1 illustrates the brake master cylinder according to a first embodiment in which the brake master cylinder is under the non-operation condition. The master cylinder 10 includes a cylinder body 11. The cylinder body 11 is formed with a cylinder bore 12, having one end (i.e., the left end in FIG. 1) that is closed and the other end open, and provided with operation fluid reservoir inlets 13, 14. The operation fluid reservoir inlets 13, 14 are fitted with cylindrical portions 15a, 15b of a unit 15 for connection to a hose (not shown) so that the interiors of the cylindrical portions 15a, 15b are in communication with an operation fluid reservoir R via the hose. A grommet 16 is provided between the cylindrical portion 15a of the union 15 and the operation fluid reservoir inlet 13 for purposes of effecting a seal. A grommet 17 is also provided between the cylindrical portion 15b of the union 15 and the operation fluid reservoir inlet 14 for purposes of effecting a seal. The union 15 is connected to the cylinder body 11 with a pin 18 which penetrates a part of the union 15 and a part of the cylinder body 11.

The cylinder bore 12 includes a smaller diameter portion 12a on one end side, a larger diameter portion 12b on the other end side, and an intermediate diameter portion 12c between the smaller diameter portion 12a and the larger diameter portion 12b. A plug shaped member 19 closes the open end of the cylinder 12. The plug shaped member 19 is fitted in the cylinder bore 12 through the larger diameter portion 12b and reaches to a part of the intermediate diameter portion 12c. The plug shaped member 19 is fixed to the cylinder body 11 by a screwed engagement portion 20 with the cylinder body 11.

A first piston 21 slidably penetrates through the plug shaped member 19 and is guided by the plug shaped member 19. A second piston 22 is positioned in the cylinder bore 12. The external diameter of the first piston 21 and the external diameter of the second piston 22 are identical to each other.

The intermediate diameter potion 12c of the cylinder bore 12 is provided with a first sealing member 23 engaged with the outer peripheral surface of the first piston 21 and the inner peripheral surface of the cylinder body 11, a second sealing member 24 engaged with the outer peripheral surface of the second piston 22 and the inner peripheral surface of the cylinder body 11, a third sealing member 25 engaged with the outer peripheral surface of the second piston 22 and the inner peripheral surface of the cylinder body 11, a sleeve 26 for maintaining the distance between the first sealing member 23 and the second sealing member 24, an annular member 27 positioned between the second sealing member 24 and the third sealing member 25, a spacer 28 provided between the first sealing member 23 and the plug shape member 19, and a spacer 29 provided between the third sealing member 25 and the annular member 27. The sleeve 26 guides the first and the second pistons 21, 22. The sealing members 23, 24, 25 are defined as ring-shaped sealing cups.

The annular member 27, which guides the second piston 22, is engaged with and supported at the cylinder body 11 by way of a support member. In this embodiment, the support member includes a pair of pins. One pin 32 is fitted into a bore 30 formed on the cylinder body 11 and a bore 31 formed on the annular member 27 and the other pin 35 is fitted into a bore 33 formed on the cylinder body 11 and a bore 34 formed on the annular member 27. The pin 32 is located at a position where at least a part of the pin 32 can be visually observed through the reservoir inlet 13 from outside the cylinder body 11 under the condition before assembling the union 15 to the cylinder body 11. The pin 32 is press-fitted into the bore 30 while the pin 35 is press-fitted into the bore 33.

A first pressure chamber 36 whose right end is defined by the first piston 21 and the first sealing member 23 and whose left end is defined by the second piston 22 and the second sealing member 24 is in communication with a first outlet 39 formed on the cylinder body 11 via a bore 37 formed on the sleeve 26 and a groove 38. A second pressure chamber 40 whose right end is defined by the third sealing member 25 and the second piston 22 and whose left end is defined by the internal end of the cylinder body 11 is directly in communication with a second outlet 41 formed on the cylinder body 11.

The pins 32, 35 which engage or support the annular member 27 with respect to the cylinder body 11 posses sufficient strength to bear the thrust load affecting the annular member 27 by the pressure of one of the pressure chambers 36, 40 when the failure is generated in the other of the pressure chambers 36, 40.

A first piston return spring 42 is provided in the first pressure chamber 36. The piston return spring 42 is provided between a retainer 43 contacting the first piston 21 and a retainer 44 contacting the second piston 22. The distance between the retainer 43 and the retainer 44 is restricted below a predetermined value by a rod 45 having a head and a shaft portion that slidably penetrates through the central portion of the right end wall of the retainer 44. A second piston return spring 46 is provided in the second pressure chamber 40. The second piston return spring 46 is provided between a retainer 47 contacting the second piston 22 and a retainer 48 contacting the cylinder body 11. The distance between the retainer 47 and the retainer 48 is restricted below a predetermined value by a rod 49 having a head and a shaft portion that slidably penetrates through the central portion of the right end wall of the retainer 47 from the left to right side. The members 42–49 form a piston return mechanism 50. The piston return mechanism 50 positions the first and the second pistons 21, 22 at the respective return positions shown in FIG. 1 when an input force (i.e., a force in the left direction of FIG. 1) is not applied to the first piston 21.

The plug shaped member 19 that closes the open end of the cylinder bore 12 is formed with a groove 53 at its forward end portion. This groove 53 is in communication with the operation fluid reservoir inlet 14 via grooves 51, 52 formed on the cylinder body 11. The annular member 27 provided between the second sealing member 24 and the third sealing member 25 is formed with a groove 55 which is in communication with the operation fluid reservoir inlet 13 via a bore 54 formed on the cylinder body 11.

The first piston 21 is formed with a first small bore 56. The first small bore 56 is positioned on the first piston 21 so that the first small bore 56 is moved from the right side of the first sealing member 23 to the left side of the first sealing member 23 in accordance with leftward sliding movement of the first piston 21 from the return position and to establish communication between the first pressure chamber 36 and the operation fluid reservoir R via the groove 53 when the first piston 21 is positioned at the return position.

The second piston 22 is formed with a second small bore 57 which is positioned on the second piston 21 so that the second small bore is moved from the right side of the third sealing member 25 to the left side of the third sealing member 25 in accordance with leftward sliding movement of the second piston 22 from the return position and to establish communication between the pressure chamber 40 and the operation fluid reservoir R via the groove 55 when the second piston 22 is positioned at the return position.

The plug shaped member 19 is assembled with a sealing member 58 for providing a seal between the plug shaped member 19 and the outer surface of the first piston 21. The plug shaped member 19 is also provided with a sealing member 59 for sealing between the plug shaped member 19 and the inner surface of the cylinder body 11.

The external diameter of the first sealing member 23, the external diameter of the second sealing member 24, the external diameter of the third sealing member 25, and the external diameter of the annular member 27 are identical to one another. Axial grooves 60, 61 are formed on the inner periphery of the cylinder body 11 corresponding to the position of the small diameter portion 12a of the cylinder bore 12.

With the master cylinder 10 constructed in the foregoing manner, under the non-operation condition shown in FIG. 1, the first pressure chamber 36 is in communication with the operation fluid reservoir R via the small bore 56 of the first piston 21, and the second pressure chamber 40 is in communication with the operation fluid reservoir R via the small bore 57 of the second piston 22. When an input force is applied to the first piston 21, the input force is transmitted to the second piston 22 via the return spring 42, the first and second pistons 21, 22 slidably move leftward in FIG. 1 by the input force, and the small bore 56 of the first piston 21 moves leftward from the right side of the first sealing member 23 to the left side of the first sealing member 23 to interrupt communication between the first pressure chamber 36 and the operation fluid reservoir R. Likewise, the small bore 57 of the second piston 22 moves leftward from the right side of the third sealing member 25 to the left side of the third sealing member 25 to interrupt communication between the second pressure chamber 40 and the operation fluid reservoir R. Accordingly, the operation fluid in the first and the second pressure chambers 36, 40 is pressurized to be outputted from the outlets 39, 41. Then, when the input force to the first piston 21 is removed, the first and second pistons 21, 22 return to the return position shown in FIG. 1 by the effects of the pressure in the first and second pressure chambers 36, 40 and the piston return mechanism 50.

According to the first embodiment of the brake master cylinder shown in FIG. 1, although the external diameter of the second sealing member 24 and the external diameter of the third sealing member 25 are identical, by configuring the external diameter of the third sealing member 25 to be smaller than the external diameter of the second sealing member 24, the annular member 27 is determined to be positioned at the far most moved leftward position relative to the pins 32, 35 (i.e., as fixed initial position) by the pressure of the first pressure chamber 36. Thus, the performance of the stroke of the second piston 22 until interrupting the communication between the second pressure chamber 40 and the operation fluid reservoir R, that is, idle stroke, is stabilized.

Further, the external diameter of the first sealing member 23 may be configured to be larger than the external diameter of the second sealing member 24, while configuring the external diameter of the second sealing member 24, the external diameter of the third sealing member 25 and the external diameter of the annular member 27 to be identical to one another. In this case, the intermediate portion 12c of the cylinder bore 12 is formed in a stepped shaped manner, and the assembling performance of the sealing members 24, 25 and the annular member 27 can be improved.

Figure 2:
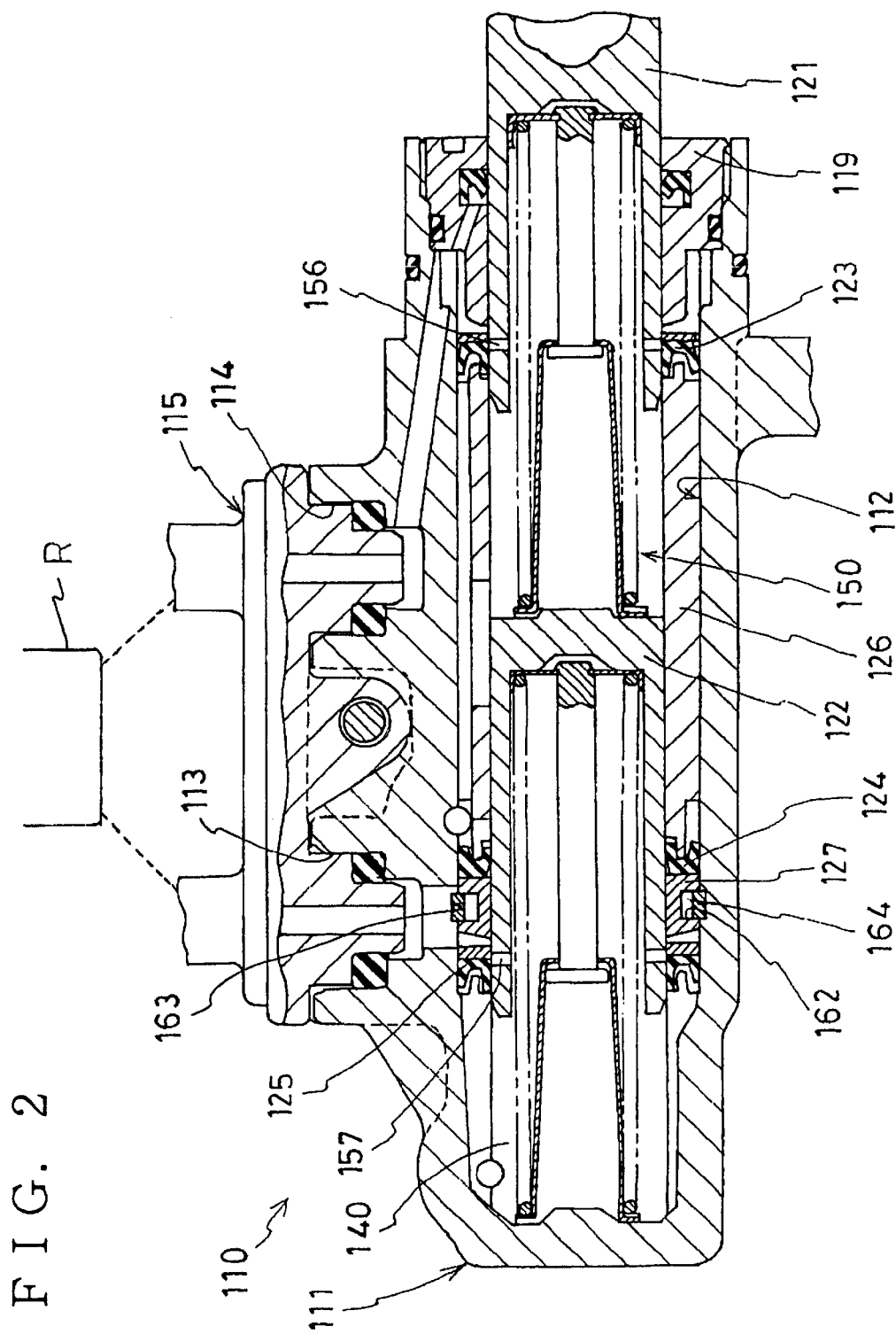
FIG. 2 is a longitudinal cross-sectional view of a brake master cylinder according to a second embodiment, with the brake master cylinder under the non-operation condition.

FIG. 2 illustrates a second embodiment of the brake master cylinder, with the brake master cylinder being shown in the non-operation condition. The differences between the second embodiment of the brake master cylinder relative to the first embodiment of the brake master cylinder involves the construction of the engagement of the annular member positioned between the second and the third sealing member relative to the cylinder body. Other features of the brake master cylinder according to the second embodiment are the same as the first embodiment. The features in the second embodiment corresponding to those in the first embodiment are designated by like reference numerals, except that features in the second embodiment shown in FIG. 2 are preceded by a "1". A detailed description of such features will not be repeated.

As shown in FIG. 2, an annular member 127 positioned between the second and third sealing members 124, 125 is supported by a ring 164. The ring 164 is engaged with an annular groove 162 formed on the outer periphery of the annular member 127 and is engaged with an annular groove 163 formed on the inner periphery of the cylinder body 111 at a position opposing the annular groove 162. The ring 164 has a rectangular shape in cross-section and is cut or divided at one place along its circumferential extent to provide elasticity in the radial direction. The annular groove 162 in the annular member 127 has a depth sufficient to accommodate the whole ring 164 by compressing the ring 164 in the radial direction. The ring 164 is inserted into the intermediate diameter portion of the cylinder bore 112 from the open end of the cylinder bore 112 while the whole ring 164 is accommodated in the annular groove 162 of the annular member 127. Then the ring 164 engages the annular groove 163 in inner periphery of the cylinder body 111 by expanding by virtue of its own elasticity when the ring 164 is opposed to the annular groove 163 of the cylinder body 111.

Figure 3:
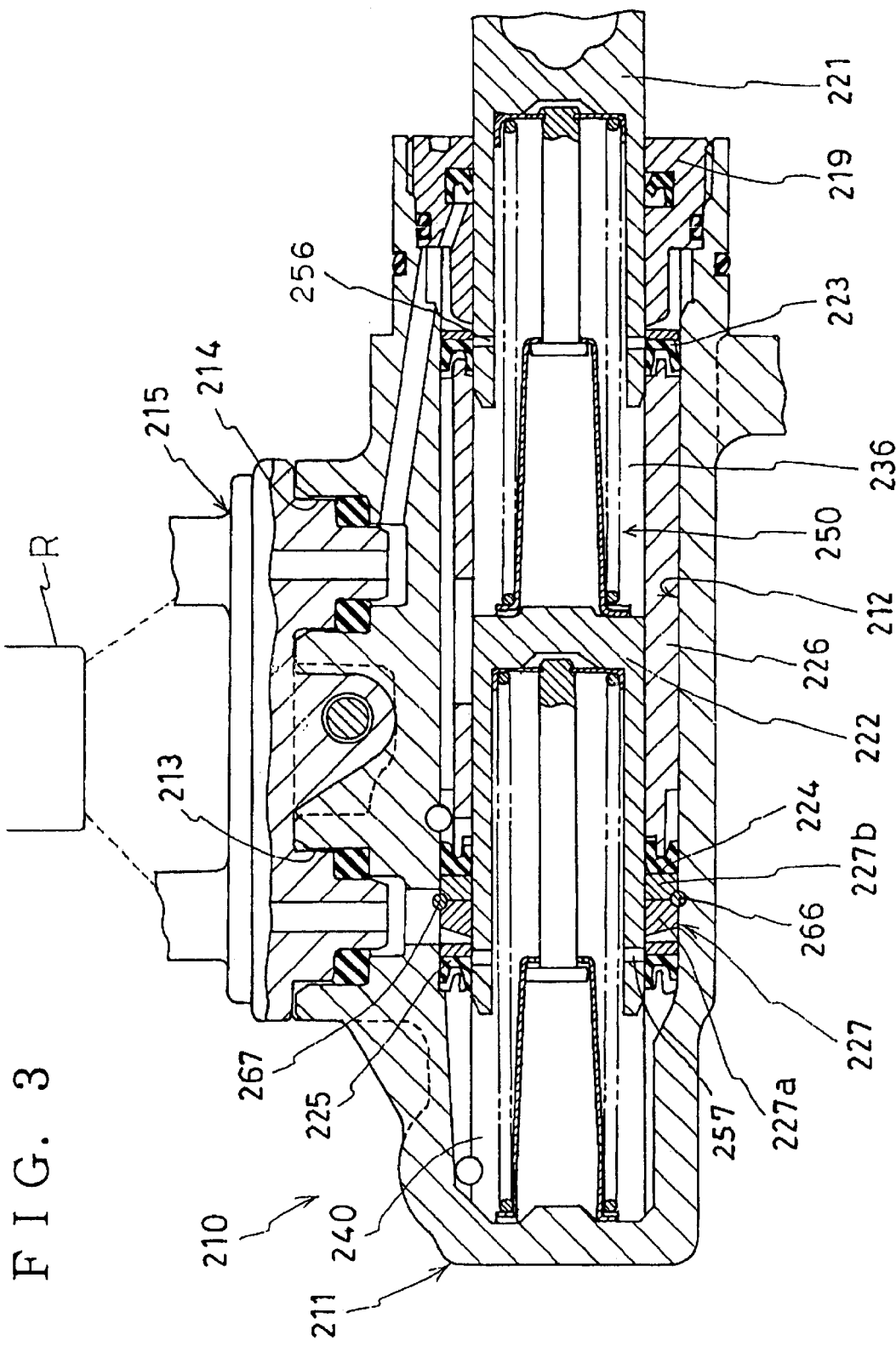
FIG. 3 is a longitudinal cross-sectional view of a brake master cylinder according to a third embodiment, with the brake master cylinder under the non-operation condition.

FIG. 3 illustrates a third embodiment of the brake master cylinder under the non-operation condition. The differences between the brake master cylinder according to the third embodiment relative to the brake master cylinder of the first embodiment relate to the construction of the engagement of the annular member positioned between the second and third sealing members relative to the cylinder body. Other features of the brake master cylinder according to the third embodiment are the same as the first embodiment. The features in the third embodiment corresponding to those in the first embodiment are designated by like reference numerals, except that features in the third embodiment shown in FIG. 3 are preceded by a "2". A detailed description of such features will not be repeated.

As shown in FIG. 3, an annular member 227 positioned between the second and third sealing members 224, 225 is divided into an annular body 227a and an annular body 227b. A ring 267 is engaged with an annular recess portion 266 formed on the inner periphery of the cylinder body 211. The internal peripheral portion of the ring 267 projects from the annular recess portion 266 and is positioned between the annular body 227a and the annular body 227b. The ring 267 has a circular cross-section and is cut or divided at one place along its circumferential extent to provide elasticity in the radial direction. The ring 267 supports the annular body 227a so that the annular body 227a is not moved rightward relative to the cylinder body 211 and supports the annular body 227b, which functions so that the annular body 227a does not move rightward relative to the cylinder body 211, so that the annular body 227b is not moved leftward relative to the cylinder body 211.

Figure 4:
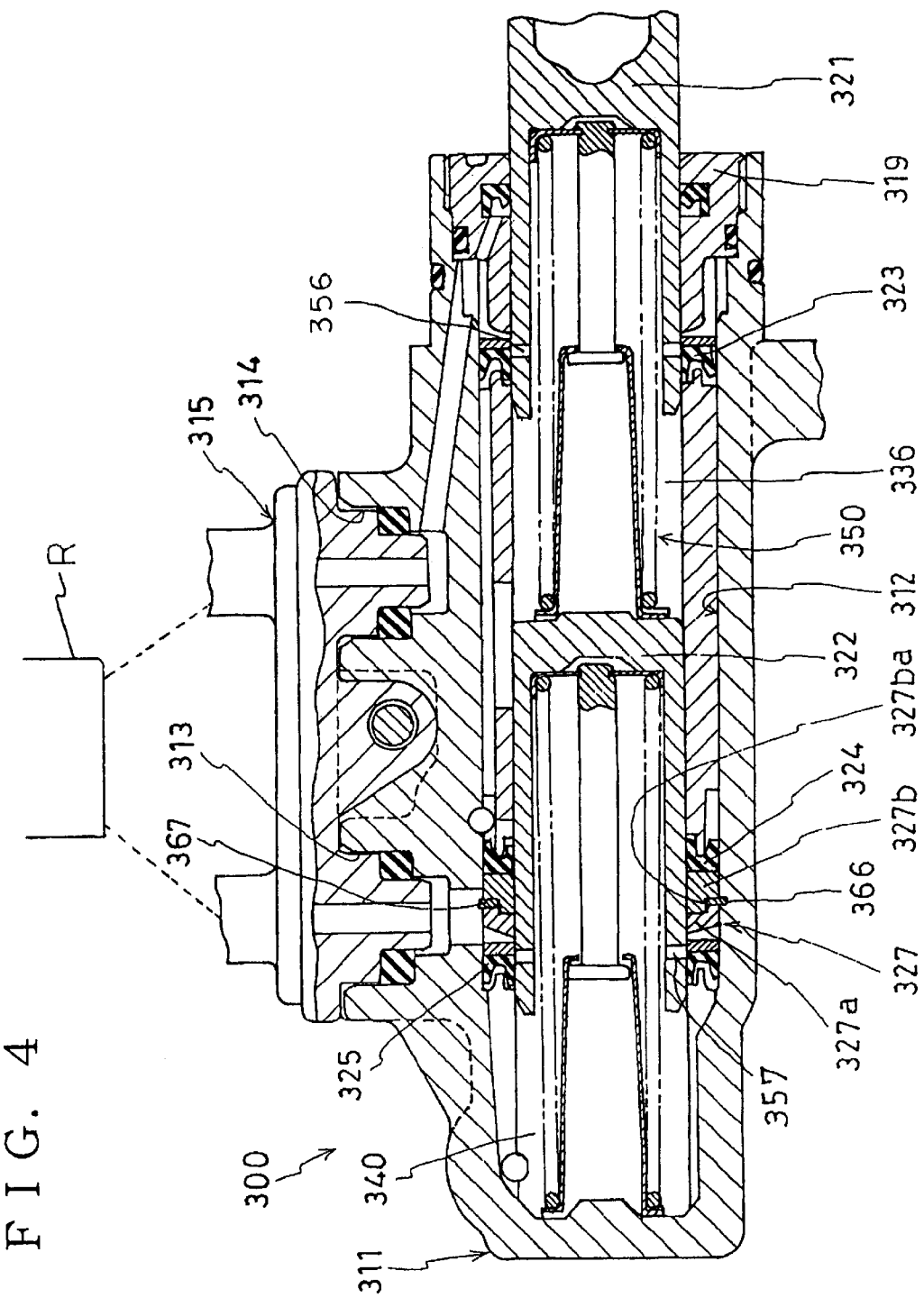
FIG. 4 is a longitudinal cross-sectional view of a brake master cylinder according to a fourth embodiment, with the brake master cylinder under the non-operation condition.

FIG. 4 illustrates a fourth embodiment of the brake master cylinder under the non-operation condition. The differences between the brake master cylinder according to the fourth embodiment relative to the brake master cylinder according to the first embodiment involve the construction of the engagement of the annular member positioned between the second and third sealing members relative to the cylinder body. Other features of the brake master cylinder according to the fourth embodiment are the same as the first embodiment. The features in the fourth embodiment corresponding to those in the first embodiment are designated by like reference numerals, except that features in the fourth embodiment shown in FIG. 4 are preceded by a "3". A detailed description of such features is not repeated.

As shown in FIG. 4, an annular member 327 positioned between the second and a third sealing members 324, 325 is divided into an annular body 327a and an annular body 327b. A ring 367 is engaged with an annular recess portion 366 formed on the inner periphery of the cylinder body 311. The inner peripheral portion of the ring 367 projects from the annular recess portion 366 and is positioned between the annular body 327a and the annular body 327b. The ring 367 has a rectangular cross-section and is cut or divided at one place along its circumferential extent to provide elasticity in the radial direction. The ring 367 supports the annular body 327a so that the annular body 327a is not moved rightward relative to the cylinder body 311 and supports the annular body 327b, which functions so that the annular body 327a does not move rightward relative to the cylinder body 311, so that the annular body 327b is not moved leftward relative to the cylinder body 311. The annular body 327b has a stepped external diameter portion 327ba that is sized to approximate the inner periphery of the ring 367 under the assembled condition. Thus, the maintenance of the annular member 327 is strengthened when receiving a thrust load in the event one of the first and second pressure chambers 336, 340 fails.

According to the embodiments of the brake master cylinder described above and illustrated in the drawing figures, the first sealing member is engaged with the inner peripheral surface of the cylinder body and the outer peripheral surface of the first piston, the second sealing member is engaged with the inner peripheral surface of the cylinder body and the outer peripheral surface of the second piston, and the third sealing ember is engaged with the inner peripheral surface of the cylinder body and the outer peripheral surface of the second piston. Thus, the internal diameter of the cylinder body can be generally approximated to the external diameter of the piston to thereby reduce the external diameter of the master cylinder. In addition, because one end of the cylinder bore does not have an opening, high reliability can be obtained. Further, because the sealing member is provided between the inner peripheral surface of the cylinder bore and the outer peripheral surface of the piston, air bleeding can be preformed relatively easily and the assembling performance of the sealing member is preferable.

With the embodiments of the brake master cylinder described above and illustrated in the drawing figures, when a failure occurs in one of the first and second pressure chambers, the pressurized fluid is outputted from the other of the first and second pressure chambers.

The brake master cylinders also allow the shape of the cylinder bore to be further simplified by configuring the external diameter of the first sealing member, the external diameter of the second sealing member, the external diameter of the third sealing member, and the external diameter of the annular member to be identical to one another. Also, the shape of the cylinder bore can be simplified and the assembling performance between the second and third sealing members and the annular member improved by configuring the external diameter of the second sealing member, the external diameter of the third sealing member, and the external diameter of the annular member to be identical to one another and by dimensioning the external diameter of the first sealing member to be larger than the external diameter of the second sealing member.

The idle stroke of the piston can be made relatively stable by stabilizing the position of the annular member through use of the pressure in the first pressure chamber by configuring the external diameter of the third sealing member to be smaller than the external diameter of the second sealing member.

Also, the construction of the brake master cylinders described above and illustrated in the drawing figures allows the support member to be visually observed through the operation fluid reservoir inlet that is formed on the cylinder body and extends from the exterior surface of the cylinder body toward the outer periphery of the annular body. Also, in the case of the pin formed as a support member, the pin can be easily assembled through the reservoir inlet.

In the case where the support member is in the form of a radially elastic ring engaged with an annular groove formed on the outer periphery of the annular member and engaged with an annular groove formed on the inner periphery of the cylinder body in opposition to the annular groove on the annular member, the ring can be relatively easily inserted from the open end of the cylinder bore along with the annular member. In this version, the annular groove of the annular member has a depth sufficient to accommodate the entire ring by compression of the ring.

As described above, other versions of the brake master cylinder involves a support member in the form of a radially elastic split ring that is engaged with an annular recess portion formed on the inner periphery of the cylinder body and having an inner periphery projecting from the annular recess portion. The annular member is divided into two annular bodies, with the ring being positioned between the two annular bodies. The ring and the two annular bodies can be inserted from the open end of the cylinder bore separately.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing form the spirit of the present invention. Accordingly, it is expressly intended that all such variations, changes and equivalents which fall within the spirit and scope of the present invention as defined in the claims, be embraced thereby.

What is claimed is:

1. A brake master cylinder comprising:
   a cylinder body having a cylinder bore including a closed end and an open end;
   a plug shaped member positioned in the open end of the cylinder bore and secured to the cylinder body;
   a slidable first piston extending through the plug shaped member;
   a second piston positioned in the cylinder bore;
   a first sealing member engaged with an outer periphery of the first piston and an inner periphery of the cylinder body;
   a second sealing member engaged with an outer periphery of the second piston and the inner periphery of the cylinder body;
   a third sealing member positioned between the second sealing member and the closed end of the cylinder bore, the third sealing member being engaged with the outer peripheral surface of the second piston and the inner peripheral surface of the cylinder body;
   a first pressure chamber, one end of which is defined by the second piston and the second sealing member, and the other end of which is defined by the first piston and the first sealing member;
   a second pressure chamber, one end of which is defined by the cylinder body and the other end of which is defined by the second piston and the third sealing member;
   a piston return mechanism for returning the first piston and the second piston to respective return positions;
   a first radial bore formed on the first piston and movable from one side of the first sealing member to an opposite side of the first sealing member upon sliding movement of the first piston from the return position toward the closed end of the cylinder bore, the first radial bore establishing communication between the first pressure chamber and a reservoir when the first piston is positioned at the return position;
   a second radial bore formed on the second piston and movable from one side of the third sealing member to an opposite side of the third sealing member upon sliding movement of the second piston from the return position toward the closed end of the cylinder bore, the second radial bore establishing communication between the second pressure chamber and the reservoir when the second piston is positioned at the return position; and
   an annular member supported by the cylinder body and positioned between the second sealing member and the third sealing member for supporting the second and third sealing members with respect to the cylinder body.

2. The brake master cylinder according to claim 1, further comprising a support member supporting the annular member on the cylinder body, the support member possessing a strength sufficient to withstand a thrust load affecting the annular member by pressure from one of the first and second pressure chambers when a failure is generated in the other of the first and second pressure chambers.

3. The brake master cylinder according to claim 2, wherein an external diameter of the third sealing member is smaller than an external diameter of the second sealing member.

4. The brake master cylinder according to claim 2, further comprising an operation fluid reservoir inlet formed on the cylinder body and extending from an outer surface of the cylinder body toward an outer periphery of the annular member, the support member being positioned so that at least part of the support member is visually observable from outside the cylinder body through the operation fluid reservoir inlet.

5. The brake master cylinder according to claim 2, wherein the support member includes a pin fitted into a radial bore formed on the cylinder body and into another radial bore formed on the annular member.

6. The brake master cylinder according to claim 2, wherein the support member includes a ring engaged with an annular groove formed on an outer periphery of the annular member and engaged with an annular groove formed on an inner periphery of the cylinder body, the annular groove on the inner periphery of the cylinder body opposing the annular groove formed on the outer periphery of the annular member, the ring possessing radial elasticity and the annular groove of the annular member having a depth for accommodating the entirety of the ring upon radial compression of the ring.

7. The brake master cylinder according to claim 2, wherein the support member includes a ring engaged with an annular recessed portion formed on an inner periphery of the cylinder body, an inner peripheral portion of the ring projecting from the annular recessed portion, the ring being possessing radial elasticity, the annular member being divided into two annular bodies, and the ring being positioned between the two annular bodies.

8. The brake master cylinder according to claim 1, wherein an external diameter of the first sealing member, an external diameter of the second sealing member, an external diameter of the third sealing member, and an external diameter of the annular member are identical to one another.

9. The brake master cylinder according to claim 1, wherein an external diameter of the second sealing member, an external diameter of the third sealing member, and an external diameter of the annular member are identical to one another, and an external diameter of the first sealing member is greater than the external diameter of the second sealing member.

10. The brake master cylinder according to claim 1, wherein the plug shaped member receives a thrust load affecting the first sealing member by pressure from the first pressure chamber.

11. The brake master cylinder according to claim 1, further comprising a sleeve positioned in the first pressure chamber for maintaining a longitudinal distance between the first sealing member and the second sealing member.

12. The brake master cylinder according to claim 1, wherein the cylinder bore includes a stepped cylinder having a smaller diameter portion adjacent the closed end, a larger diameter portion adjacent the open end of the cylinder bore, and an intermediate diameter portion provided between the smaller diameter portion and the larger diameter portion, the first, second and third sealing members being positioned in the intermediate diameter portion.

13. A brake master cylinder comprising:
- a cylinder body having a cylinder bore closed at one end and open at an opposite end;
- a plug member threadably engaged with the cylinder body at the open end of the cylinder bore;
- an axially movable first piston passing through the plug member, the first piston being provided with a first through bore in a wall of the first piston;
- an axially movable second piston positioned in the cylinder bore, the second piston being provided with a second through bore in a wall of the second piston;
- a first sealing member providing a liquid-tight seal between an outer periphery of the first piston and an inner periphery of the cylinder body;
- a second sealing member providing a liquid-tight seal between an outer periphery of the second piston and the inner periphery of the cylinder body;
- a third sealing member providing a liquid-tight seal between the outer peripheral surface of the second piston and the inner peripheral surface of the cylinder body, the third seal being located axially between the second sealing member and the closed end of the cylinder bore;
- a first pressure chamber in the cylinder bore between the first piston and the second piston;
- a second pressure chamber in the cylinder bore between the closed end of the cylinder bore and the second piston;
- a pair of springs each applying a force to one of the first and second pistons to urge the first piston and the second piston to respective return positions at which the first through bore provides communication between the first pressure chamber and a first reservoir inlet formed in the cylinder bore and the second through bore provides communication between the second pressure chamber and a second reservoir inlet formed in the cylinder bore;
- the first through bore of the first piston being movable relative to the first sealing member upon sliding movement of the first piston from the return position toward the closed end of the cylinder bore;
- the second through bore of the second piston being movable relative to the third sealing member upon sliding movement of the second piston from the return position toward the closed end of the cylinder bore; and
- an annular member supported at the cylinder bore by a support member, the annular member being positioned between the second sealing member and the third sealing member to support the second and third sealing members.

14. The brake master cylinder according to claim 13, wherein the first sealing member, the second sealing member, the third sealing member and the annular member each have an outer diameter that is equal to one another.

15. The brake master cylinder according to claim 13, wherein the second sealing member, the third sealing member and the annular member each have an outer diameter that is equal to one another.

16. The brake master cylinder according to claim 13, wherein the second fluid reservoir inlet extends from an outer surface of the cylinder body toward an outer periphery of the annular member, the support member being positioned so that at least part of the support member is visually observable from outside the cylinder body through the second fluid reservoir inlet.

17. The brake master cylinder according to claim 13, wherein the support member includes a pair of pins each fitted into a respective bore in the cylinder body and a respective bore in the annular member.

18. The brake master cylinder according to claim 13, wherein the support member includes a ring engaged with an annular groove formed on an outer periphery of the annular member and engaged with an annular groove formed on an inner periphery of the cylinder body, the annular groove on the inner periphery of the cylinder body opposing the annular groove formed on the outer periphery of the annular member, the ring possessing radial elasticity and the annular groove of the annular member having a depth for accommodating the entirety of the ring upon radial compression of the ring.

19. The brake master cylinder according to claim 13, wherein the support member includes a ring engaged with an annular recessed portion formed on an inner periphery of the cylinder body, an inner peripheral portion of the ring projecting from the annular recessed portion, the ring being possessing radial elasticity, the annular member being divided into two annular bodies, and the ring being positioned between the two annular bodies.

* * * * *